April 15, 1924.
A. H. BACON
NAIL
Filed June 19, 1922
1,490,722
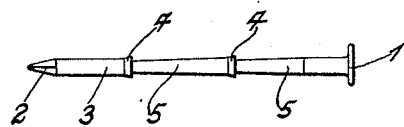
Inventor:
Allan H. Bacon,
by Rippey Kingsland
His Attorneys.

Patented Apr. 15, 1924.

1,490,722

UNITED STATES PATENT OFFICE.

ALLAN H. BACON, OF ST. LOUIS, MISSOURI.

NAIL.

Application filed June 19, 1922. Serial No. 569,302.

*To all whom it may concern:*

Be it known that I, ALLAN H. BACON, a citizen of the United States, residing at St. Louis, Missouri, have invented a new and useful Nail, of which the following is a specification.

This invention relates to nails.

An object of the invention is to provide a nail having one or more abrupt shoulders at a selected point or points thereon, for obtaining engagement with the wood or material into which the nail is driven to prevent the nail from working loose and from being easily withdrawn.

Another object of the invention is to provide a nail having one or more shoulders thereon formed at the union of a reduced portion of the nail with a larger portion thereof.

In the drawing is shown an elevation of one form of my improved nail.

As shown my improved nail has a head 1 on one end thereof and a point 2 on the opposite end. From the point 2 the body 3 of the nail is of approximately uniform diameter to the circumferential shoulder 4 which may be formed by applying pressure to the nail to produce a tapered portion 5 having the small end thereof in connection with the shouldered end 4 of the part 3. The application of the pressure forces the material of the nail into the shoulder 4.

If desired a number of such shoulders may be provided, two being shown.

When the nail is driven into the wood or other material the part 3 forms the opening which is enlarged somewhat as the shoulder or shoulders pass into the material. After the nail has been driven home the material presses around the tapered portion 5 against the outer ends of the shoulders 4 preventing the nail from working loose and rendering the withdrawal thereof quite difficult.

The body 3 of the nail being of the same diameter adjacent to the head and adjacent to the point, and the shoulders 4 being of greater diameter than the diameter of the body permits the nail to be driven into a hole having the same diameter as the diameter of the body. In such case the shoulders 4, being of greater diameter than the diameter of the body of the nail and also of greater diameter than the diameter of the hole, press into the material and form rigid engagement. In this respect the nail is designed and adapted for use in places in which nails provided with shoulders of no greater diameter than the body of the nail and of no greater diameter than the hole in which they are driven could not be usefully employed.

It will be seen that my invention accomplishes all of its intended objects and purposes in an efficient manner.

What I claim and desire to secure by Letters Patent is:—

1. A nail comprising a stem composed of an end portion having a point and being of uniform diameter from the beginning of the point toward the opposite end of the stem, a shoulder of larger diameter than said portion of said stem at the end of said portion between the point and the head, a tapering portion having the smaller end thereof united with the end portion at said shoulder, and a head on the end of the stem opposite from the point.

2. A nail comprising a stem having one end pointed and having a portion thereof of uniform diameter from the beginning of the point toward the head, a tapered portion united with the first-named portion, an abrupt shoulder of larger diameter than said first-named portion and said tapered portion at the point of union of said portions, and a shoulder of larger diameter than any part of said tapered portion at the larger end of said tapered portion.

3. A nail comprising a stem having one end pointed and having a portion thereof of uniform diameter from the beginning of the point toward the head, a tapered portion united with the first-named portion, an abrupt shoulder of larger diameter than said first-named portion and said tapered portion at the point of union of said portions, a shoulder of larger diameter than any part of said tapered portion at the larger end of said tapered portion, and an additional tapered portion united with the larger end of the first-named tapered portion at said last-named shoulder.

ALLAN H. BACON.